No. 874,605.
PATENTED DEC. 24, 1907.
J. S. LOSCH.
FRICTION CLUTCH.
APPLICATION FILED JUNE 12, 1907.
2 SHEETS—SHEET 1.
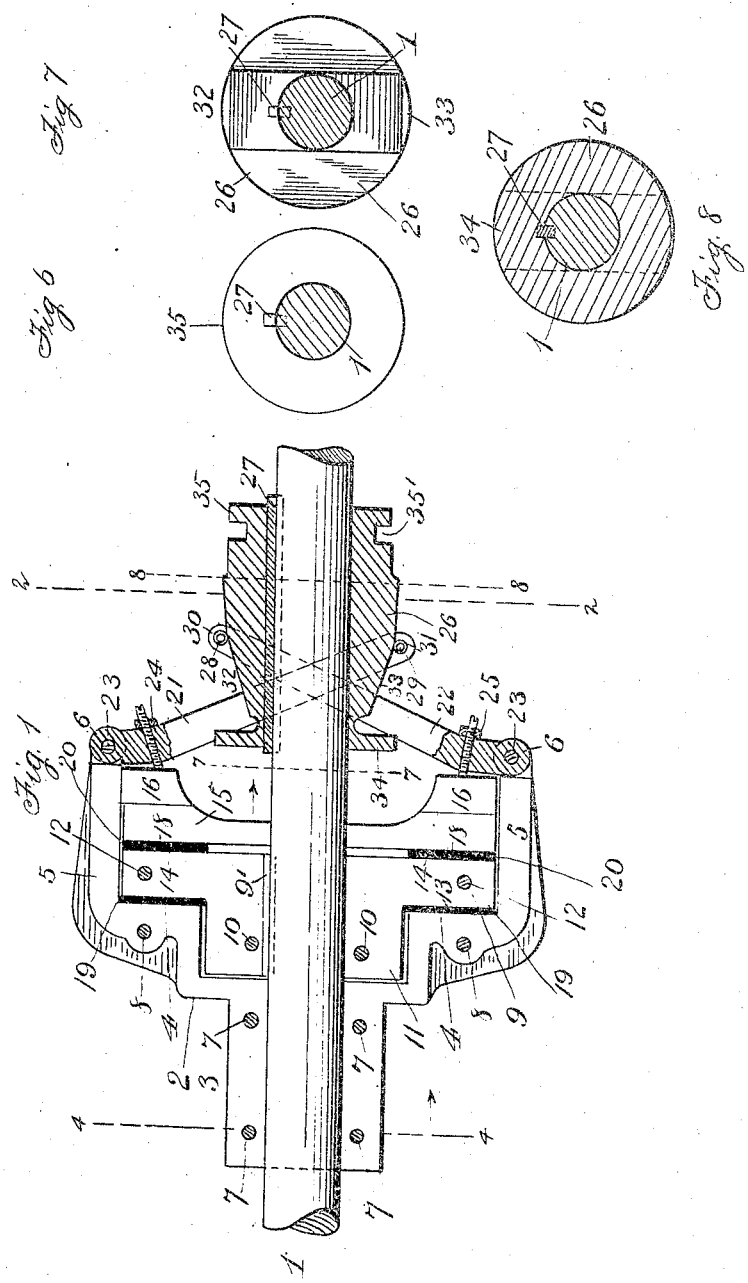

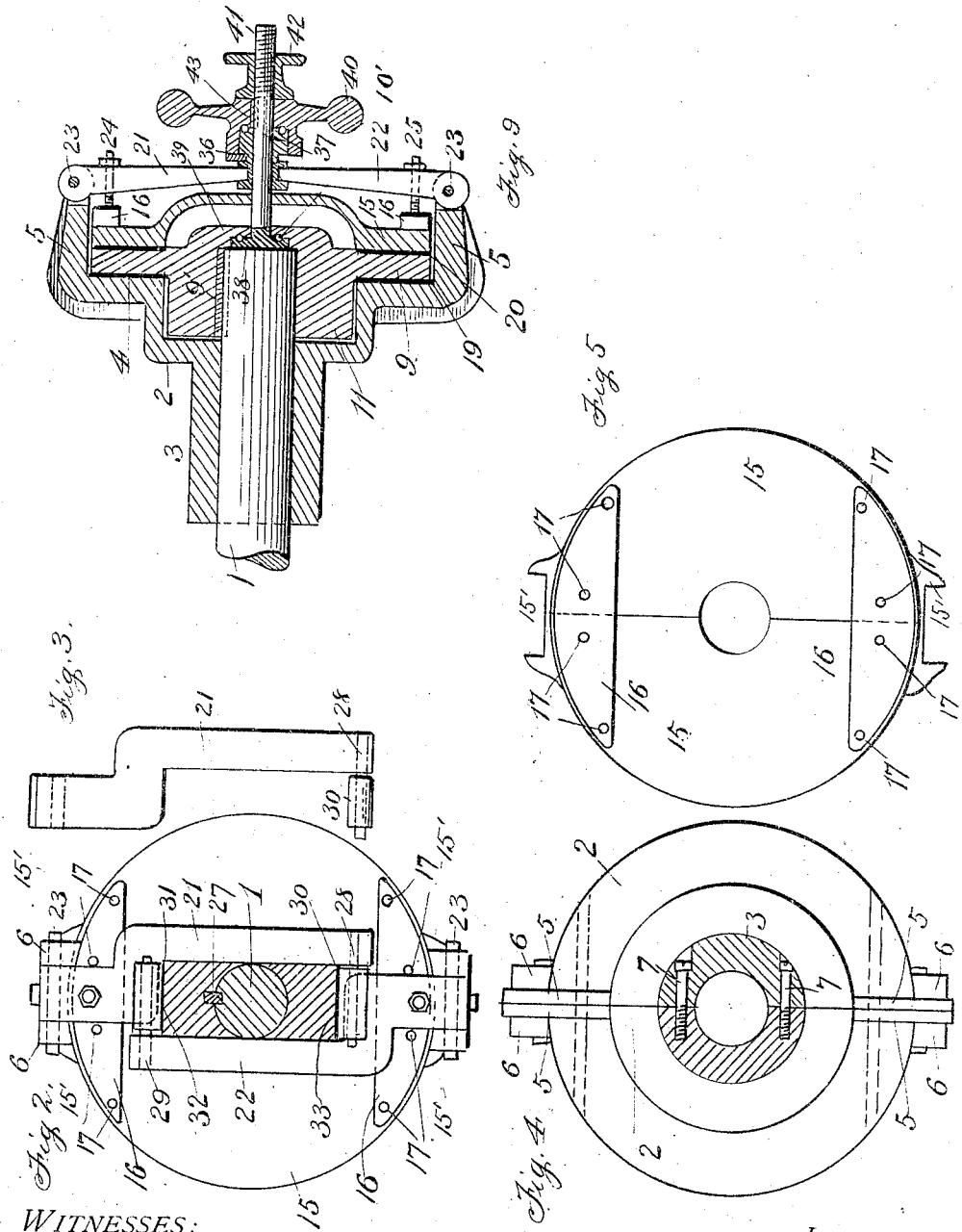

UNITED STATES PATENT OFFICE.

JOHN S. LOSCH, OF READING, PENNSYLVANIA.

FRICTION-CLUTCH.

No. 874,605. Specification of Letters Patent. Patented Dec. 24, 1907.

Application filed June 12, 1907. Serial No. 378,560.

*To all whom it may concern:*

Be it known that I, JOHN S. LOSCH, a citizen of the United States, residing at Reading, in the county of Berks and State of Pennsylvania, have invented certain new and useful Improvements in Friction-Clutches; and I do hereby declare the following to be a full, clear, and exact description of the invention, such as will enable others skilled in the art to which it appertains to make and use the same.

My invention relates to clutches, has especial reference to that class known as friction clutches, has for its object economy in construction and efficiency in operation, and consists in certain improvements which will be fully disclosed in the following specification and claims.

In the accompanying drawings, which form part of this specification:—Figure 1 represents a vertical longitudinal section, partly in elevation of a clutch embodying my invention. Fig. 2 a transverse section on line 2, 2, Fig. 1. Fig. 3 a front elevation of one of the operating levers detached. Fig. 4 a section on line 4, 4, Fig. 1. Fig. 5 a plan view of the outer ring detached. Fig. 6 an end view of the expanding head or sleeve. Fig. 7 a transverse detail section on line 7, 7, Fig. 1, showing the inner end of the head. Fig. 8 a like view on line 8, 8, Fig. 1, and Fig. 9 a vertical longitudinal section partly in elevation, showing a modification of the device.

Reference being had to the drawings and the designating characters thereon, the numeral 1 indicates a shaft, 2 a base or body provided with a hub 3 to receive a pulley, not shown, an annular seat 4, and on opposite sides are arms 5, 5, terminating in lugs 6, 6. The base is made in two parts separated longitudinally so that it can be applied to a shaft without disturbing its alinement, and the parts are secured together on the shaft by transverse bolts 7, in the hub 3, and bolts 8 in the base or body.

9 indicates an annular friction plate also made in two parts, and secured together on the shaft 1 within the base by bolts 10 passing through the hub 11, and bolts 12, extending through the plate, and the plate is secured against revolving on the shaft by a key 9'. The plate 9 is provided with opposite bearing surfaces 13, 14, and adjacent to the plate 9 is a supplemental plate 15, also made in two parts and secured together on the shaft 1 by transverse bars 16 secured to the sections of the plate by bolts 17, and said plate is provided with a bearing surface 18, and between the seat 4 and the bearing surface 13 a ring 19 of leather or other like substance or material is inserted, and between the surfaces 14 and 18 a ring 20 of like material is inserted to produce resistance to the bearing surfaces revolving on each other and forming an effective clutch. The plate 15 is provided with lugs 15' which engage the arms 5 and prevent the plate revolving on the shaft 1. To the lugs 6 are pivotally secured levers 21 and 22 by pins or bolts 23 and said levers are provided with adjustable screws 24, 25 which rest upon the bars 16, and each forms a fulcrum for its respective lever to force the friction members together and effectually lock them under pressure.

26 indicates a head or sleeve longitudinally movable on the shaft 1 and secured thereto by a spline 27, and engaged by the levers 21, 22, each of which is provided with a laterally projecting pin 28, 29 on which are rollers 30, 31 which bear upon the faces 32 and 33 respectively of the head 26. The part of the head engaged by the levers is rectangular in cross section, and the faces 32 and 33 are preferably curved as shown. On the inner end of the head is a rectangular flange 34 and at the opposite end is a circular flange 35, adjacent to which is a concentric groove 35' to receive the inturned ends of a lever, not shown, for moving the head in opposite directions to operate the clutch.

In the operation of the clutch, the inward movement of the head or sleeve 26 forces the levers 21 and 22 in the same direction, and the pins 24, 25 pressing upon the bars 16 force the ring or plate 15 against the ring 20, while the base or body 2 is drawn toward the ring 19, and effectually locks the base with its pulley, not shown, to the plates or members 9 and 15 and drive the pulley with the shaft 1.

In Fig. 9, I have shown a modification of my invention adapted for use on the end of a shaft, and in which the base 2 and the plates 9 and 15 are not separated transversely. The levers 21 and 22 engage a sleeve 36 on a rod 37, having a flange 38 which engages a bar 39 on the plate 9, and is provided with a ball bearing 10'. The sleeve 36, is connected to a hand wheel 40, and outside or on the end of the screw-threaded portion 41 of the rod 37, is a nut 42. The wheel 40 is secured to the rod 37 by a key 43 and revolves therewith and as the rod revolves in the nut 42, which is held against rotation in any suitable manner, the levers 21 and 22 are moved and pressure applied to the plates 9 and 15 and form an effectual clutch.

It is obvious that changes in construction can be made without departing from the spirit of my invention.

Having thus fully described my invention, what I claim is

1. In a device of the class described, a base having an annular seat, and arms integral therewith, an annular plate, a ring of flexible material between said seat and plate and within said arms, levers connected to the outer ends of said arms, and a movable head engaging the free ends of said levers.

2. In a device of the class described, a separable base having an annular fixed seat and provided with external arms integral therewith, an annular plate, a ring of flexible material between said seat and plate, a supplemental plate, a ring of flexible material between said plates, said plates and rings being separable transversely, levers connected to the outer ends of said arms, and a movable head engaging the free ends of said levers.

3. In a device of the class described, a separable base having a hub and an annular seat integral therewith, and provided with arms, an annular plate having lugs engaging said arms, a ring of flexible material between said seat and plate, a supplemental plate, a ring of flexible material between said plates, said plates and rings being separable transversely, levers connected to said arms, and a movable head having curved bearing surfaces engaged by said levers.

In testimony whereof I affix my signature, in presence of two witnesses.

JOHN S. LOSCH.

Witnesses:
H. S. CRAUMER,
WM. W. TROOP.